US009120484B1

(12) United States Patent
Ferguson et al.

(10) Patent No.: US 9,120,484 B1
(45) Date of Patent: Sep. 1, 2015

(54) MODELING BEHAVIOR BASED ON OBSERVATIONS OF OBJECTS OBSERVED IN A DRIVING ENVIRONMENT

(75) Inventors: David I. Ferguson, San Francisco, CA (US); Jiajun Zhu, Sunnyvale, CA (US); Dmitri A. Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/253,429

(22) Filed: Oct. 5, 2011

Related U.S. Application Data

(60) Provisional application No. 61/390,094, filed on Oct. 5, 2010, provisional application No. 61/391,271, filed on Oct. 8, 2010.

(51) Int. Cl.
*B60W 30/08* (2012.01)
*G06K 9/00* (2006.01)

(52) U.S. Cl.
CPC ........... *B60W 30/08* (2013.01); *G06K 9/00805* (2013.01); *G06K 9/00798* (2013.01)

(58) Field of Classification Search
CPC .............. B60W 30/08; B60W 30/095; B60W 30/0956; G06K 9/00798; G06K 9/00805
USPC ............ 701/28, 223, 301; 382/104, 113, 169, 382/217; 706/46; 707/10
See application file for complete search history.

(56) References Cited

U.S. PATENT DOCUMENTS

| 1,924,984 | A | 8/1933 | Fageol |
| 3,186,508 | A | 6/1965 | Lamont |
| 3,324,805 | A | 6/1967 | Mulch |
| 3,596,728 | A | 8/1971 | Neville |
| 4,372,414 | A | 2/1983 | Anderson et al. |
| 4,387,783 | A | 6/1983 | Carman |

(Continued)

FOREIGN PATENT DOCUMENTS

| DE | 10218010 A1 | 11/2003 |
| DE | 10336986 A1 | 3/2005 |

(Continued)

OTHER PUBLICATIONS

"Fact Sheet: Beyond Traffic Signals: A Paradigm Shift Intersection Control for Autonomous Vehicles", [online]. [Retrieved Apr. 27, 2011]. Retrieved from the internet: <http://www.fhwa.dot.gov/advancedresearch/pubs/10023/index.cfm>, 3 pages.

(Continued)

*Primary Examiner* — Fadey Jabr
*Assistant Examiner* — Aaron L Troost
(74) *Attorney, Agent, or Firm* — Lerner, David, Littenberg, Krumholz & Mentlik, LLP

(57) ABSTRACT

A method and apparatus are provided for determining one or more object models used by an autonomous vehicle to predict the behavior of detected objects. The autonomous vehicle may collect and record object behavior using one or more sensors. The autonomous vehicle may then communicate the recorded object behavior to a server operative to determine the object models. The server may determine the object models according to a given object classification, a particular driving environment, or a combination thereof. The server may then communicate the object models to the autonomous vehicle for use in predicting the actions of detected objects and for responding accordingly.

23 Claims, 9 Drawing Sheets

(56) References Cited

U.S. PATENT DOCUMENTS

| | | | |
|---|---|---|---|
| 4,656,834 A | 4/1987 | Elpern |
| 4,924,795 A | 5/1990 | Ottemann |
| 4,970,653 A | 11/1990 | Kenue |
| 4,982,072 A | 1/1991 | Takigami |
| 5,187,666 A | 2/1993 | Watanabe |
| 5,415,468 A | 5/1995 | Latarnik et al. |
| 5,448,487 A | 9/1995 | Arai |
| 5,470,134 A | 11/1995 | Toepfer et al. |
| 5,684,696 A | 11/1997 | Rao et al. |
| 5,774,069 A | 6/1998 | Tanaka et al. |
| 5,790,403 A | 8/1998 | Nakayama |
| 5,906,645 A | 5/1999 | Kagawa et al. |
| 5,913,376 A | 6/1999 | Takei |
| 5,954,781 A | 9/1999 | Slepian et al. |
| 6,064,926 A | 5/2000 | Sarangapani et al. |
| 6,070,682 A | 6/2000 | Isogai et al. |
| 6,151,539 A | 11/2000 | Bergholz et al. |
| 6,195,610 B1 | 2/2001 | Kaneko |
| 6,321,147 B1 | 11/2001 | Takeda et al. |
| 6,332,354 B1 | 12/2001 | Lalor |
| 6,343,247 B2 | 1/2002 | Jitsukata et al. |
| 6,385,539 B1 | 5/2002 | Wilson et al. |
| 6,438,472 B1 | 8/2002 | Tano et al. |
| 6,438,491 B1 | 8/2002 | Farmer |
| 6,470,874 B1 | 10/2002 | Mertes |
| 6,504,259 B1 | 1/2003 | Kuroda et al. |
| 6,516,262 B2 | 2/2003 | Takenaga et al. |
| 6,591,172 B2 | 7/2003 | Oda et al. |
| 6,643,576 B1 | 11/2003 | O Connor et al. |
| 6,832,156 B2 | 12/2004 | Farmer |
| 6,836,719 B2 | 12/2004 | Andersson et al. |
| 6,847,869 B2 | 1/2005 | Dewberry et al. |
| 6,862,524 B1 | 3/2005 | Nagda et al. |
| 6,876,908 B2 | 4/2005 | Cramer et al. |
| 6,934,613 B2 | 8/2005 | Yun |
| 7,011,186 B2 | 3/2006 | Frentz et al. |
| 7,031,829 B2 | 4/2006 | Nisiyama |
| 7,102,496 B1 | 9/2006 | Ernst, Jr. et al. |
| 7,177,760 B2 | 2/2007 | Kudo |
| 7,194,347 B2 | 3/2007 | Harumoto et al. |
| 7,207,304 B2 | 4/2007 | Iwatsuki et al. |
| 7,233,861 B2 * | 6/2007 | Van Buer et al. ............. 701/424 |
| 7,327,242 B2 | 2/2008 | Holloway et al. |
| 7,340,332 B2 | 3/2008 | Underdahl et al. |
| 7,346,439 B2 | 3/2008 | Bodin |
| 7,394,046 B2 | 7/2008 | Olsson et al. |
| 7,486,802 B2 * | 2/2009 | Hougen ........................ 382/104 |
| 7,499,774 B2 | 3/2009 | Barrett et al. |
| 7,499,776 B2 | 3/2009 | Allard et al. |
| 7,499,804 B2 | 3/2009 | Svendsen et al. |
| 7,515,101 B1 | 4/2009 | Bhogal et al. |
| 7,565,241 B2 | 7/2009 | Tauchi |
| 7,579,942 B2 | 8/2009 | Kalik |
| 7,656,280 B2 | 2/2010 | Hines et al. |
| 7,694,555 B2 | 4/2010 | Howell et al. |
| 7,778,759 B2 | 8/2010 | Tange et al. |
| 7,818,124 B2 | 10/2010 | Herbst et al. |
| 7,835,859 B2 | 11/2010 | Bill |
| 7,865,277 B1 | 1/2011 | Larson et al. |
| 7,894,951 B2 | 2/2011 | Norris et al. |
| 7,908,040 B2 | 3/2011 | Howard et al. |
| 7,956,730 B2 | 6/2011 | White et al. |
| 7,979,175 B2 | 7/2011 | Allard et al. |
| 8,050,863 B2 | 11/2011 | Trepagnier et al. |
| 8,078,349 B1 | 12/2011 | Prada Gomez et al. |
| 8,126,642 B2 | 2/2012 | Trepagnier et al. |
| 8,190,322 B2 | 5/2012 | Lin et al. |
| 8,195,341 B2 | 6/2012 | Huang et al. |
| 8,244,408 B2 | 8/2012 | Lee et al. |
| 8,260,515 B2 | 9/2012 | Huang et al. |
| 8,280,601 B2 | 10/2012 | Huang et al. |
| 8,280,623 B2 | 10/2012 | Trepagnier et al. |
| 8,352,111 B2 | 1/2013 | Mudalige |
| 8,352,112 B2 | 1/2013 | Mudalige |
| 8,412,449 B2 | 4/2013 | Trepagnier et al. |
| 8,452,506 B2 | 5/2013 | Groult |
| 8,634,980 B1 | 1/2014 | Urmson et al. |
| 8,706,394 B2 | 4/2014 | Trepagnier et al. |
| 8,718,861 B1 | 5/2014 | Montemerlo et al. |
| 2001/0037927 A1 | 11/2001 | Nagler et al. |
| 2003/0016804 A1 | 1/2003 | Sheha et al. |
| 2003/0055554 A1 | 3/2003 | Shioda et al. |
| 2003/0093209 A1 | 5/2003 | Andersson et al. |
| 2004/0243292 A1 | 12/2004 | Roy |
| 2005/0012589 A1 | 1/2005 | Kokubu et al. |
| 2005/0125154 A1 | 6/2005 | Kawasaki |
| 2005/0149251 A1 | 7/2005 | Donath et al. |
| 2005/0273251 A1 | 12/2005 | Nix et al. |
| 2006/0037573 A1 | 2/2006 | Iwatsuki et al. |
| 2006/0082437 A1 | 4/2006 | Yuhara |
| 2006/0089764 A1 | 4/2006 | Filippov et al. |
| 2006/0089800 A1 | 4/2006 | Svendsen et al. |
| 2006/0173841 A1 | 8/2006 | Bill |
| 2006/0178240 A1 | 8/2006 | Hansel |
| 2006/0276942 A1 | 12/2006 | Anderson et al. |
| 2007/0010942 A1 | 1/2007 | Bill |
| 2007/0165910 A1 | 7/2007 | Nagaoka et al. |
| 2007/0225909 A1 | 9/2007 | Sakano |
| 2007/0239331 A1 | 10/2007 | Kaplan |
| 2007/0247281 A1 | 10/2007 | Shimomura |
| 2008/0021628 A1 | 1/2008 | Tryon |
| 2008/0039991 A1 | 2/2008 | May et al. |
| 2008/0059015 A1 | 3/2008 | Whittaker et al. |
| 2008/0059048 A1 | 3/2008 | Kessler et al. |
| 2008/0084283 A1 * | 4/2008 | Kalik ............................ 340/435 |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1 | 7/2008 | Benzinger et al. |
| 2008/0188246 A1 | 8/2008 | Sheha et al. |
| 2008/0195268 A1 | 8/2008 | Sapilewski et al. |
| 2008/0277183 A1 | 11/2008 | Huang et al. |
| 2008/0303696 A1 | 12/2008 | Aso et al. |
| 2008/0306969 A1 * | 12/2008 | Mehta et al. ..................... 707/10 |
| 2009/0005959 A1 * | 1/2009 | Bargman et al. ............... 701/117 |
| 2009/0074249 A1 | 3/2009 | Moed et al. |
| 2009/0082879 A1 | 3/2009 | Dooley et al. |
| 2009/0115594 A1 | 5/2009 | Han |
| 2009/0198400 A1 | 8/2009 | Allard et al. |
| 2009/0248231 A1 | 10/2009 | Kamiya |
| 2009/0276154 A1 | 11/2009 | Subramanian et al. |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0319096 A1 | 12/2009 | Offer et al. |
| 2009/0319112 A1 | 12/2009 | Fregene et al. |
| 2009/0326799 A1 | 12/2009 | Crook |
| 2010/0017056 A1 | 1/2010 | Asakura et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179720 A1 | 7/2010 | Lin et al. |
| 2010/0191433 A1 | 7/2010 | Groult |
| 2010/0205132 A1 * | 8/2010 | Taguchi ........................... 706/46 |
| 2010/0228419 A1 | 9/2010 | Lee et al. |
| 2010/0241297 A1 | 9/2010 | Aoki et al. |
| 2010/0253542 A1 | 10/2010 | Seder et al. |
| 2010/0256836 A1 | 10/2010 | Mudalige |
| 2011/0071718 A1 | 3/2011 | Norris et al. |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0213511 A1 | 9/2011 | Visconti et al. |
| 2011/0246156 A1 | 10/2011 | Zecha et al. |
| 2011/0254655 A1 | 10/2011 | Maalouf et al. |
| 2011/0264317 A1 | 10/2011 | Druenert et al. |
| 2012/0053775 A1 | 3/2012 | Nettleton et al. |
| 2012/0114178 A1 | 5/2012 | Platonov et al. |
| 2012/0157052 A1 | 6/2012 | Quade |
| 2012/0277947 A1 | 11/2012 | Boehringer et al. |
| 2013/0054049 A1 | 2/2013 | Uno |

(56) References Cited

U.S. PATENT DOCUMENTS

| | | |
|---|---|---|
| 2013/0054106 A1 | 2/2013 | Schmudderich et al. |
| 2013/0179382 A1 | 7/2013 | Fritsch et al. |
| 2014/0088855 A1 | 3/2014 | Ferguson |

FOREIGN PATENT DOCUMENTS

| | | |
|---|---|---|
| EP | 0884666 A1 | 12/1998 |
| EP | 2216225 A1 | 8/2010 |
| JP | 09066853 | 3/1997 |
| JP | 09-160643 A | 6/1997 |
| JP | 11282530 A | 10/1999 |
| JP | 2000149188 A | 5/2000 |
| JP | 2000305625 A | 11/2000 |
| JP | 2000-338008 A | 12/2000 |
| JP | 2001-101599 A | 4/2001 |
| JP | 2002236993 A | 8/2002 |
| JP | 2002251690 A | 9/2002 |
| JP | 2003081039 A | 3/2003 |
| JP | 2003162799 A | 6/2003 |
| JP | 2005067483 A | 3/2005 |
| JP | 2005071114 A | 3/2005 |
| JP | 2005-339181 A | 12/2005 |
| JP | 2006322752 A | 11/2006 |
| JP | 2007001475 A | 1/2007 |
| JP | 2008117082 A | 5/2008 |
| JP | 2008152655 A | 7/2008 |
| JP | 2008170404 A | 7/2008 |
| JP | 2008290680 A | 12/2008 |
| JP | 2009053925 A | 3/2009 |
| WO | 0070941 A1 | 11/2000 |
| WO | 0188827 | 11/2001 |
| WO | 2007145564 A1 | 12/2007 |
| WO | WO 2009/028558 A1 * | 3/2009 |
| WO | WO2009/028558 A1 * | 3/2009 |
| WO | 2009155228 A1 | 12/2009 |
| WO | 2011021046 A1 | 2/2011 |

OTHER PUBLICATIONS

"Google Cars Drive Themselves, in Traffic" [online]. [Retrieved Aug. 19, 2011] Retrieved from the internet: <http://www.nytimes.com/2010/10/10/science/10google.html>, 4 pages.

Carl Crane, David Armstrong, Antonio Arroyo, Antoin Baker, Doug Dankel, Greg Garcia, Nicholas Johnson, Jaesang Lee, Shannon Ridgeway, Eric Schwartz, Eric Thorn, Steve Velat, and Ji Hyun Yoon, Team Gator Nation's Autonomous Vehicle Development for the 2007 DARPA Urban Challenge, Dec. 2007, 27 pages.

Martin Schonhof, Martin Treiber, Arne Kesting, and Dirk Helbing, Autonomous Detection and Anticipation of Jam Fronts From Messages Propagated by Intervehicle Communication, 2007, pp. 3-12.

Vincenzo DiLecce and Marco Calabrese, Experimental System to Support Real-Time Driving Pattern Recognition, 2008, pp. 1192-1199.

International Search Report and the Written Opinion for Application No. PCT/US 2011/054154, Apr. 24, 2012.

International Search Report and Written Opinion for Application No. PCT/UC2011/054899 dated May 4, 2012.

International Search Report and the Written Opinion for Application No. PCT/US 2011/054896, Apr. 25, 2012.

Eric Guizzo, How's Google's Self-Driving Car Works, IEEE. Org, IEEE, Oct. 18, 2011, pp. 1/31/-31/31.

International Search Report and Written Opinion for Application No. PCT/US2013/061604 dated Jul. 3, 2014.

Matthew McNaughton, Motion Planning for Autonomous Driving with a Conformal Spatiotempral Lattice, Internation Conference on Robotics and Automation, May 9-13, pp. 4889-4895.

Chinese Office Action for Application No. 201180057942.8 dated Jun. 3, 2015.

* cited by examiner

MODELING BEHAVIOR BASED ON OBSERVATIONS OF OBJECTS OBSERVED IN A DRIVING ENVIRONMENT

CROSS-REFERENCE TO RELATED APPLICATIONS

The present application claims the benefit of the filing date of U.S. Provisional Application No. 61/390,094 filed Oct. 5, 2010, and U.S. Provisional Application No. 61/391,271 filed Oct. 8, 2010, the disclosures of which are hereby incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

An issue that an autonomous vehicle may encounter is determining what action to take given various circumstances. For example, when an autonomous vehicle detects a bicycle near an intersection, the autonomous vehicle may not know whether the bicycle intends to turn at the intersection or intends to continue traveling along its current path. Similarly, when the autonomous vehicle detects another vehicle in an adjacent lane, the autonomous vehicle may not know whether the detected vehicle intends to change lanes, slow down, speed up, travel along its current path, or perform a combination of these actions. Without having a prediction of knowing what the detected vehicle or detected bicycle will do, the autonomous vehicle may not know which action to take should the detected bicycle or detected vehicle deviate from its current path.

BRIEF SUMMARY

An apparatus for determining object models used by an autonomous vehicle to predict the behavior of a corresponding object is disclosed. In one embodiment, the apparatus includes a memory operative to store object data comprising behavior data for a first detected object, and a processor in communication with the memory. The processor may be operative to receive the object data from a monitoring source, analyze the object data to determine a corresponding object classification, and determine whether an object model exists for the corresponding object classification. The processor may be further operative to determine the object model for the corresponding object classification based on the received object data when an object model does not exist for the corresponding object classification, and update the object model for the corresponding object classification based on the received object data when the object model exists for the corresponding object classification.

In another embodiment of the apparatus, the object data further comprises driving environment data that corresponds to a driving environment where the first detected object was detected.

In a further embodiment of the apparatus, the processor is further operative to determine the driving environment from the driving environment data, and the processor determines whether the object model exists for the corresponding object classification by determining whether the object model exists for the corresponding classification and for the determined driving environment.

In yet another embodiment of the apparatus, the monitoring source is an autonomous vehicle.

In yet a further embodiment of the apparatus, the detected object is a non-vehicle object.

In another embodiment of the apparatus, the object model comprises a plurality of probabilities, wherein at least one probability is based on a path of travel that the first detected object was observed traveling.

In a further embodiment of the apparatus, at least one probability of the plurality of probabilities identifies a probability that a second detected object will travel an associated path of travel previously traveled by the first detected object.

In yet another embodiment of the apparatus, the object model comprises a plurality of probabilities, wherein at least one probability is based on a speed at which the first detected object was observed moving.

In yet a further embodiment of the apparatus, at least one probability of the plurality of probabilities identifies a probability that a second detect object will have an associated speed at which the first detected object was observed moving.

In another embodiment of the apparatus, the processor is further operative to determine a plurality of object models for the corresponding object classification, wherein each object model corresponds to a given driving environment.

In a further embodiment of the apparatus, the processor is further operative to communicate the object model to an autonomous vehicle.

A method for determining object models used by an autonomous vehicle to predict the behavior of a corresponding object is also disclosed. In one embodiment, the method includes receiving, with a processor, object data from a monitoring source, wherein the object data comprises behavior data for a first detected object, analyzing, with the processor, the object data to determine a corresponding object classification, and determining whether an object model exists for the corresponding object classification. The method may also include determining the object model for the corresponding object classification based on the received object data when an object model does not exist for the corresponding object classification, and updating the object model for the corresponding object classification based on the received object data when the object model exists for the corresponding object classification.

In another embodiment of the method, the object data further comprises driving environment data that corresponds to a driving environment where the first detected object was detected.

In a further embodiment of the method, the method may include determining the driving environment from the driving environment data and determining whether the object model exists for the corresponding object classification by determining whether the object model exists for the corresponding classification and for the determined driving environment.

In yet another embodiment of the method, the monitoring source is an autonomous vehicle.

In yet a further another embodiment of the method, the detected object is a non-vehicle object.

In another embodiment of the method, the object model comprises a plurality of probabilities, wherein at least one probability is based on a path of travel that the first detected object was observed traveling.

In a further embodiment of the method, at least one probability of the plurality of probabilities identifies a probability that a second detected object will travel an associated path of travel previously traveled by the first detected object.

In yet another embodiment of the method, the object model comprises a plurality of probabilities, wherein at least one probability is based on a speed at which the first detected object was observed moving.

In yet a further embodiment of the method, at least one probability of the plurality of probabilities identifies a probability that a second detect object will have an associated speed at which the first detected object was observed moving.

In another embodiment of the method, the method may include further comprising determining a plurality of object models for the corresponding object classification, wherein each object model corresponds to a given driving environment.

In a further embodiment of the method, the method may include communicating the object model to an autonomous vehicle.

Another apparatus for determining object models used by an autonomous vehicle to predict the behavior of a corresponding object is also disclosed. In one embodiment, the apparatus may include a memory operative to store object data comprising behavior data for a plurality of detected objects, and a processor in communication with the memory. The processor may be operative to receive the object data from a source that monitored the behavior of the plurality of detected objects, identify at least one object classification for corresponding objects selected from the plurality of detected objects based on the received object data, and identify at least one driving environment for corresponding objects selected from the plurality of detected objects based on the received object data. The processor may also be operative to determine a plurality of object models for objects selected from the plurality of detected objects, wherein an object model for a selected object is determined based on the at least one object classification and the at least one driving environment identified for the selected object.

DETAILED DESCRIPTION

This disclosure is directed to an apparatus and method for modeling the behavior of objects detectable by an autonomous vehicle. In particular, this disclosure is directed to an autonomous vehicle that records the behavior of detected objects, such as pedestrians, other vehicles, and the like, and then communicates the recorded behaviors to an object behavior model server. The object behavior model servers may then formulate models for the detected objects in one or more driving environments, such as a detected pedestrian in a crosswalk, a vehicle entering a highway, a bicycle traveling on a roadway, and other such driving environments. The autonomous vehicle may then use the behavior models and/or behavior data to respond to the predicted behavior of a detected object.

Figure 1:
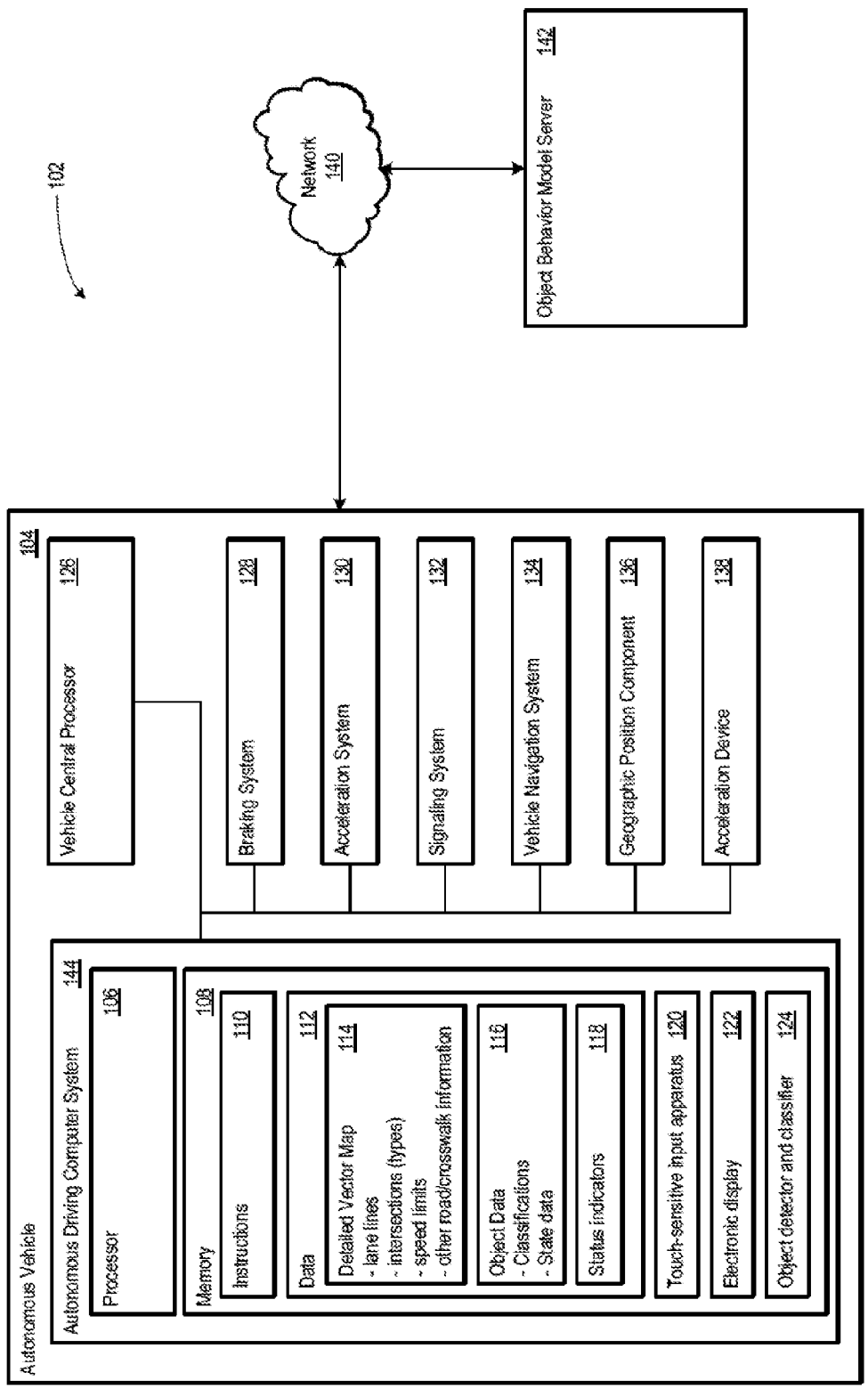
FIG. 1 illustrates an example of an apparatus for determining object models for objects detected by an autonomous vehicle according to aspects of the disclosure.

As shown in FIG. 1, an apparatus 102 for modeling the behavior of one or more detected objects includes an autonomous vehicle 104 that may communicate with an object behavior model server 142. While certain aspects of the invention are particularly useful in connection with specific types of vehicles, the autonomous vehicle 104 may be any type of autonomous vehicle including, but not limited to, cars, trucks, motorcycles, busses, boats, airplanes, helicopters, lawnmowers, recreational vehicles, amusement park vehicles, trams, golf carts, trains, and trolleys. The autonomous vehicle 104 may include one or more computers and/or processors, such as the autonomous driving computer system 144 and/or a vehicle central processor 126.

In one embodiment, the autonomous driving computer system 144 may include a processor 106 and a memory 108. The autonomous driving computer system 144 may also include other components typically present in a general purpose computer.

The memory 108 may store information accessible by the processor 106, such as instructions 110 and data 112 that may be executed or otherwise used by the processor 106. The memory 108 may be of any type of memory operative to store information accessible by the processor 106, including a computer-readable medium, or other medium that stores data that may be read with the aid of an electronic device. Examples of the memory 108 include, but are not limited, a hard-drive, a memory card, read-only memory ("ROM"), random-access memory ("RAM"), digital video disc ("DVD"), or other optical disks, as well as other write-capable and read-only memories. Systems and methods may include different combinations of the foregoing, whereby different portions of the instructions and data are stored on different types of media.

The instructions 110 may be any set of instructions that may be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance. Functions, methods and routines of the instructions 110 are explained in more detail below.

The data 112 may be retrieved, stored, or modified by processor 106 in accordance with the instructions 110. For instance, although the disclosed embodiments not limited by any particular data structure, the data 112 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 112 may comprise any information sufficient to identify the relevant information, such as numbers, descriptive text, proprietary codes, references to data stored in other areas of the same memory or different memories (including other network locations) or information that is used by a function to calculate the relevant data.

The processor 106 may be any conventional processor, such as processors from the Intel Corporation or Advanced Micro Devices ("AMD"). Alternatively, the processor may be a dedicated device such as an applicant-specific integrated circuit ("ASIC"). Although FIG. 1 functionally illustrates the processor 106, the memory 108, and other elements of the autonomous driving computer system 144 as being within the same block, it will be understood by those of ordinary skill in the art that the processor 106 and the memory 108 may actually comprise multiple processors and memories that may or may not be stored within the same physical housing. For example, the memory 108 may be a hard drive or other storage media located in a housing different from that of the autonomous driving computer system 144. Accordingly, references to a processor or computer will be understood to include references to a collection of processors or computers or memories that may or may not operate in parallel. Rather than using a single processor to perform the acts described herein, some of the components, such as steering components and deceleration components, may each have their own processor that only performs calculations related to the component's specific function.

In various embodiments described herein, the processor 106 may be located remote from the autonomous vehicle 104 and may communicate with the autonomous vehicle 10 wirelessly. In other aspects, some of the processes described herein are executed on a processor disposed within the autonomous vehicle 104 and others by a remote processor, including taking the acts necessary to execute a single maneuver.

The autonomous driving computer system 144 may include all of the components normally used in connection with a computer, such as a central processing unit (CPU), a memory (e.g., RAM and internal hard drives) storing data 112 and instructions such as an Internet browser or other software application, an electronic display 122 (e.g., a monitor having a screen, a small liquid crystal display ("LCD") touch-screen or any other electrical device that is operable to display information), one or more user input devices (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

The vehicle may also include a geographic position component 136 in communication with the autonomous driving computer system 144 for determining the geographic location of the autonomous vehicle 104. For example, the geographic position component 136 may include a Global Positioning System ("GPS") receiver to determine the autonomous vehicle's 104 latitude, longitude and/or altitude position. Other location systems such as laser-based localization systems, inertial-aided GPS, or camera-based localization may also be used to identify the location of the vehicle. The location of the autonomous vehicle 104 may include an absolute geographical location, such as latitude, longitude, and altitude as well as relative location information, such as location relative to other vehicles immediately around it which can often be determined with less noise than absolute geographical location.

The geographic position component 136 may also include other devices in communication with the autonomous driving computer system 144, such as an accelerometer, gyroscope or another direction/speed detection device 138 to determine the direction and speed of the vehicle or changes thereto. By way of example only, the geographic position component 136 may determine its pitch, yaw or roll (or changes thereto) relative to the direction of gravity or a plane perpendicular thereto. The geographic position component 136 may also track increases or decreases in speed and the direction of such changes. The location and orientation data as set forth herein may be provided automatically to the user, the autonomous driving computer 144, the vehicle central processor 126, other computers and combinations of the foregoing.

The autonomous driving computer system 144 may control the direction and speed of the autonomous vehicle 104 by controlling various components. By way of example, if the autonomous vehicle 104 is operating in a completely autonomous mode, the autonomous driving computer system 144 may cause the autonomous vehicle 104 to accelerate via the acceleration system 130 (e.g., by increasing fuel or other energy provided to the engine), decelerate via the braking system 128 (e.g., by decreasing the fuel supplied to the engine or by applying brakes) and change direction (e.g., by turning the front two wheels). The autonomous driving computer system 144 may also control one or more systems, such as the signaling system 132, when controlling the acceleration system 130 and/or the braking system 128.

The autonomous driving computer system 144 may also control one or more status indicators 118, which may convey the status of the autonomous vehicle 104 and its components to a passenger. For example, the autonomous vehicle 104 may be equipped with an electronic display 122 for displaying information relating to the overall status of the vehicle, particular sensors, or information about or from the autonomous driving computer system 144. The electronic display 122 may display computer-generated images of the vehicle's surroundings including, for example, the status of the autonomous driving computer system 144, the autonomous vehicle 104 itself, roadways, intersections, as well as other objects and information.

The autonomous driving computer system 144 may use visual or audible cues to indicate whether it is obtaining valid data from one or more sensors, whether the it is partially or completely controlling the direction or speed of the autonomous vehicle 104 or both, such as whether there are any errors, etc. In addition, autonomous driving computer system 144 may also have external indicators which indicate whether, at the moment, a human or an automated system is in control of the vehicle, that are readable by humans, other computers, or both.

The autonomous driving computer system 144 may also communicate with other components of the autonomous vehicle 104. For example, autonomous driving computer system 144 may communicate with a vehicle central processor 126. The autonomous driving computer system 144 may also send and receive information from the various systems of the autonomous vehicle 104. Communicating with the various systems may include communicating with the braking system 128, the acceleration system 130, the signaling system 132, and the vehicle navigation system 134. Communications with these systems may facilitate the control of the movement, speed, etc. of the autonomous vehicle 104. In addition, when engaged, autonomous driving computer system 144 may control some or all of these functions of the autonomous vehicle 104 and thus be fully or partially autonomous. It will be understood that although various systems and the autonomous driving computer system 144 are shown within the autonomous vehicle 104, these systems and components may be external to the autonomous vehicle 104 or physically separated by large distances.

Figure 2:
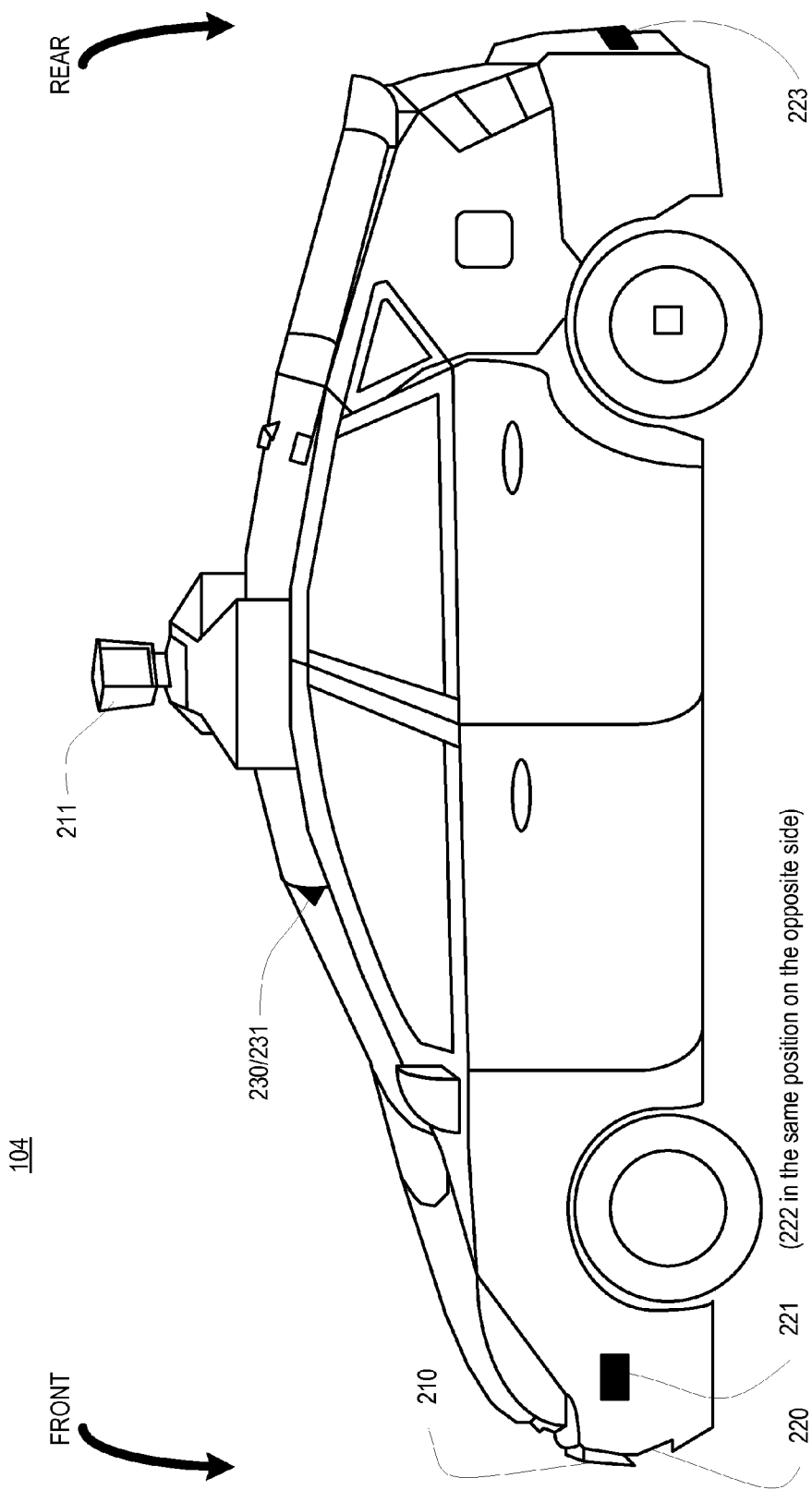
FIG. 2 illustrates an example of the placement of one or more sensors on an autonomous vehicle according to aspects of the disclosure.

The autonomous vehicle 104 may include components for detecting objects external to it, such as other vehicles, obstacles in the roadway, traffic signals, signs, trees, etc. The detection system may include lasers, sonar, radar, cameras or any other detection devices. FIG. 2 illustrates an example of the placement of one or more sensors on an autonomous vehicle according to aspects of the disclosure. For example, where the autonomous vehicle 104 is a small passenger car, the small passenger car may include a laser 211 mounted on the roof or other convenient location 210. In one aspect, the laser 211 may measure the distance between the autonomous vehicle 104 and the object surfaces facing the autonomous vehicle 104 by spinning on its axis and changing its pitch. The autonomous vehicle 104 may also include various radar detection units 220-223, such as those used for adaptive cruise control systems. The radar detection units 220-223 may be located on the front and back of the car as well as on either side of the front bumper. In another example, a variety of cameras 230-231 may be mounted on the autonomous vehicle 104 at known distances from one another. In this manner, the parallax from the different images may be used to compute the distance to various objects captured by the one or more cameras 230-231. These sensors 210-231 may assist the vehicle in responding to its environment to maximize safety for passengers as well as objects or people in the environment.

Figure 3A:
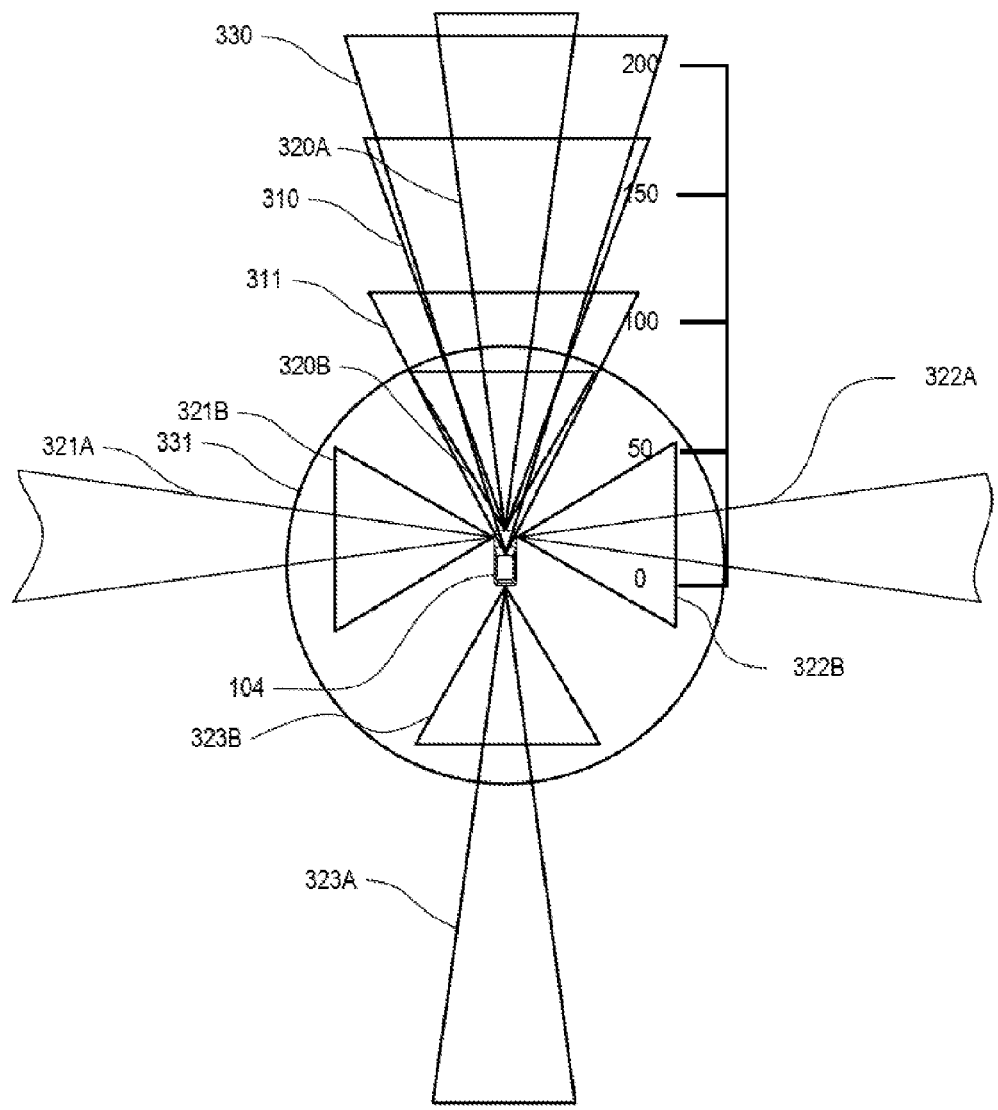
FIGS. 3A-3D illustrates various views of the approximate sensor fields of the various sensors on the autonomous vehicle according to aspects of the disclosure.
Figure 3D:
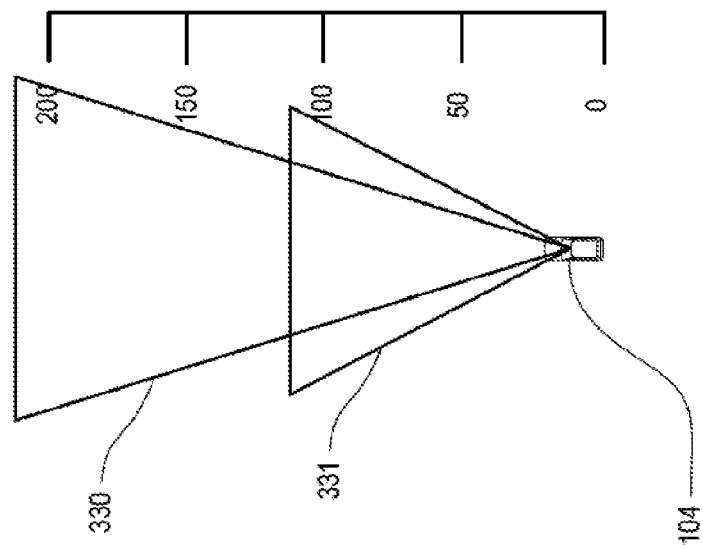
Figure 3B:
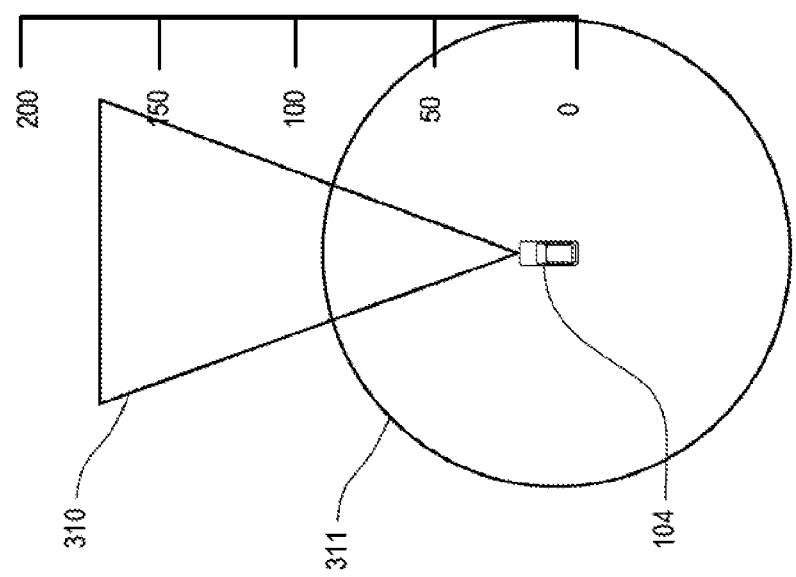

FIGS. 3A-3D illustrates various views of the approximate sensor fields of the various sensors 210-231 on the autonomous vehicle 104 according to aspects of the disclosure. FIG. 3A is a top-down view of the approximate sensor fields of the various sensors 210-231. FIG. 3B depicts the approximate sensor fields 310 and 311. For example, the sensor field 310 includes a horizontal field of view for approximately 150 meters, and the sensor field 311 includes a 360 degree horizontal field of view.

Figure 3C:
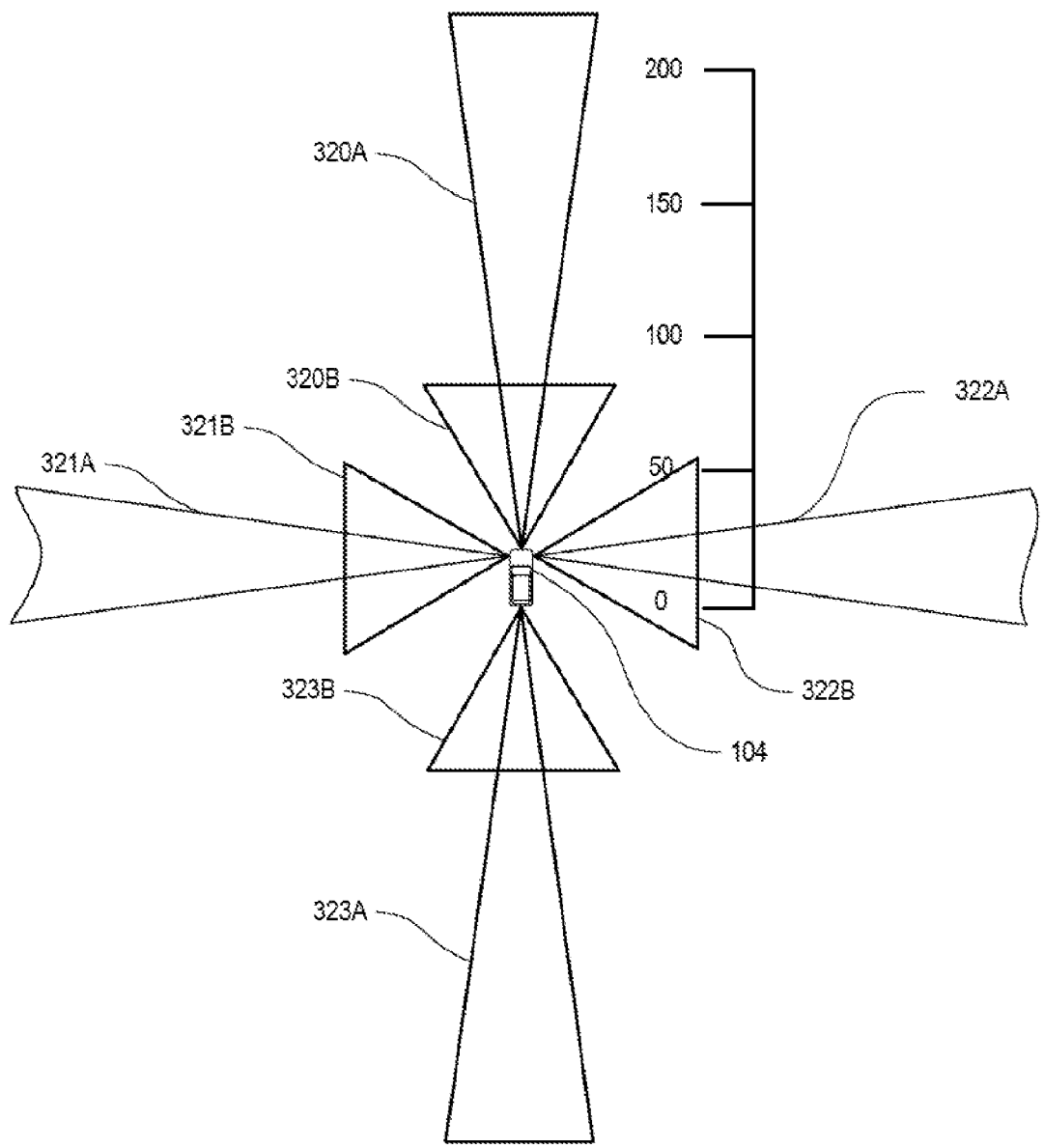

FIG. 3C depicts the approximate sensor fields 320A-323B. The sensor field 320A includes a horizontal field of view for approximately 200 meters, and the sensor field 320B includes a horizontal field of view between approximately 50-100 meters. The sensor fields 321A-323A include a horizontal field of view for approximately 200 meters, and the sensor fields 321B-323B include a horizontal field of view between 50-100 meters. The sensor fields 321A and 322A extend passed the edge of FIGS. 3A and 3C.

FIG. 3D depicts the approximate sensor fields 330-331. For example, the sensor field 330 includes a field of view for approximately 200 meters, and sensor field 331 includes a field of view of approximately 100 meters.

In addition to the sensors described above, the autonomous driving computer system 144 may also use input from sensors found in non-autonomous vehicles. As examples, these sensors may include tire pressure sensors, engine temperature sensors, brake heat sensors, break pad status, tire tread sensors, fuel sensors, oil level and quality sensors, air quality sensors (for detecting temperature, humidity, or particulates in the air), etc.

The data provided by these sensors may be processed by the autonomous driving computer system 144 in real-time. In this context, the sensors may continuously update their output to reflect the environment being sensed at or over a range of time, and continuously or as demanded. The sensors may provide the updated output to the autonomous driving computer system 144 so that it can determine whether the autonomous vehicle's 104 then-current direction or speed should be modified in response to the sensed environment.

The autonomous vehicle 104 may also include persistent data for modeling the behavior of objects using one or more of the sensors described above. For example, the data 112 may include detailed vector map information 114 that defines one or more driving environments. The detailed vector map information 114 may include various maps that identify the shape and elevation of roadways, lane lines, intersections, crosswalks, speed limits, traffic signals, buildings, signs, real time traffic information, or other such objects and information. The detailed vector map information 114 may further include explicit speed limit information associated with various roadway segments. The speed limit data may be entered manually or scanned from previously taken images of a speed limit sign using, for example, optical-character recognition. In addition, the detailed vector map information 114 may include three-dimensional terrain maps incorporating one or more of the objects (e.g., crosswalks, intersections, lane lines, etc.) listed above.

To model the behavior of detected objects, the autonomous driving computer system 144 may monitor objects in a driving corresponding to the detailed vector map information 114. For example, the autonomous driving computer system 114 may monitor objects at an intersection, including vehicles on the roadways, pedestrians in the crosswalks, the timing of traffic light signals, and other such objects. As another example, the autonomous driving computer system 114 may monitor objects entering and/or exiting a highway, such as vehicles entering the highway via an on-ramp, exiting the highway via an off-ramp and other such behaviors. The autonomous driving computer system 144 may collect and store this information as part of the object data 116.

In addition, the autonomous driving computer system 114 may refer to the detailed vector map information 114 to facilitate the development of the object models. More specifically, the autonomous driving computer system 114 may cross-reference the position of a detected object with a location in the detailed vector map information 114. Based on this cross-reference, the autonomous driving computer system 114 may then formulate the potential actions that a detected object may take based on its detected position. For example, where the autonomous driving computer system 114 detects an object entering an intersection, such as a motorcycle, light trunk, or other object, the autonomous driving computer system 114 may cross-reference the position of the detected object and determine which actions the detected object may take, such as continuing through the intersection or turning onto an intersection road. The actions recorded by the autonomous driving computer system 114 may be stored as part of the object data 116 and, as discussed below, may be communicated to the object behavior model server 142 during the development and/or revising of the corresponding object model.

To monitor objects in these various driving environments, the data 112 may include object data 116 that defines one or more parameters for classifying an object. Classifications of objects may include such classifications as "passenger car," "bicycle," "motorcycle," "pedestrian," and other such classifications. The parameters defined by the object data 116 may inform the autonomous driving computer system 144 the type of object detected by a given sensor. For example, the object data 116 may include parameters that define when an object detected by one or more camera sensors is a vehicle or when an object detected by the one or more camera sensors is a pedestrian. Similarly, the object data 116 may include parameters that define when an object detected by the lasers is a vehicle, when an object detected by the radars is a traffic cone, and other such parameters.

Objects may be identified through an object classifier 124, which may consider various characteristics of the detected objects, such as the size of an object (bicycles are larger than a breadbox and smaller than a car), the speed of the object (bicycles do not tend to go faster than 40 miles per hour or slower than 0.1 miles per hour), or the heat coming from the bicycle (bicycles tend to have rider that emit heat from their bodies), etc. In addition, the object may be classified based on specific attributes of the object, such as information contained on a license plate, bumper sticker, or logos that appear on the vehicle. The object detector and classifier 124 may refer to the object data 116 in classifying the detected object.

The object data 116 may also include state information collected by the autonomous driving computer system 144 when an object is detected. The autonomous driving computer system 144 may collect the state information about a detected object to assist in the formulation of an object model about the detected object. The object model for the detected object may define how the detected object behaves in a given situation.

State information may include characteristics about a detected object. Examples of state information include, but are not limited to, the detected object's speed, the route traveled by the object, the roadway or crosswalk on which the object is traveling, any directional or orientation changes by the object, or other such state information. The state information may also be associated with one or more segments of the detailed vector map information 114 to further refine the state of the detected object. For example, where the detected object is detected as being in an intersection (as defined by the detailed vector map information 114), the collected state information may identify that the detected object was traveling in an intersection, and may further identify the direction of the detected object, the original starting lane of the detected object, the ending lane of the detected object after the detected object turned (or even if it turned), and other such state information.

The autonomous driving computer system 144 may also collect state information about a detected object to further refine already existing object models. For example, the collected state information may supplement state information already used to initially construct the object model. In other words, the supplemental state information may provide additional statistical information about the behavior of a detected object to further refine the probable behaviors of the object in the given environment. Thus, as the autonomous vehicle 104 moves about its environment, the supplemental state information may improve the reliability and predictability of a given object model.

The autonomous vehicle 104 may collect state information about detected objects regardless of whether the autonomous vehicle 104 is operating in an autonomous mode or a non-autonomous mode. Thus, whether the autonomous vehicle 104 is operating by itself or has a driver, the autonomous vehicle 104 may collect state and object information to formulate the aforementioned object models.

It should also be understood that state and object information may be collected by other means other than the autonomous vehicle 104. For example, state and object data may be collected by a non-autonomous vehicle, satellite imagery, traffic reports, police reports, user-provided information, or other such means. In addition, these other data collection means by work in concert with the autonomous vehicle 104 and may communicate the collected state and object information to the autonomous vehicle 104. For example, one or more sensors placed in a driving environment may communicate collected state and object information to the autonomous vehicle 104 when the autonomous vehicle 104 is in proximity to a given sensor, such as when the autonomous vehicle 104 passes a sensor (e.g., where the sensor is placed in or underneath the roadway or where the sensor is placed on the side of the roadway.) Moreover, a combination of aforementioned or similar data collection means may be used in developing the disclosed object models.

Figure 4A:
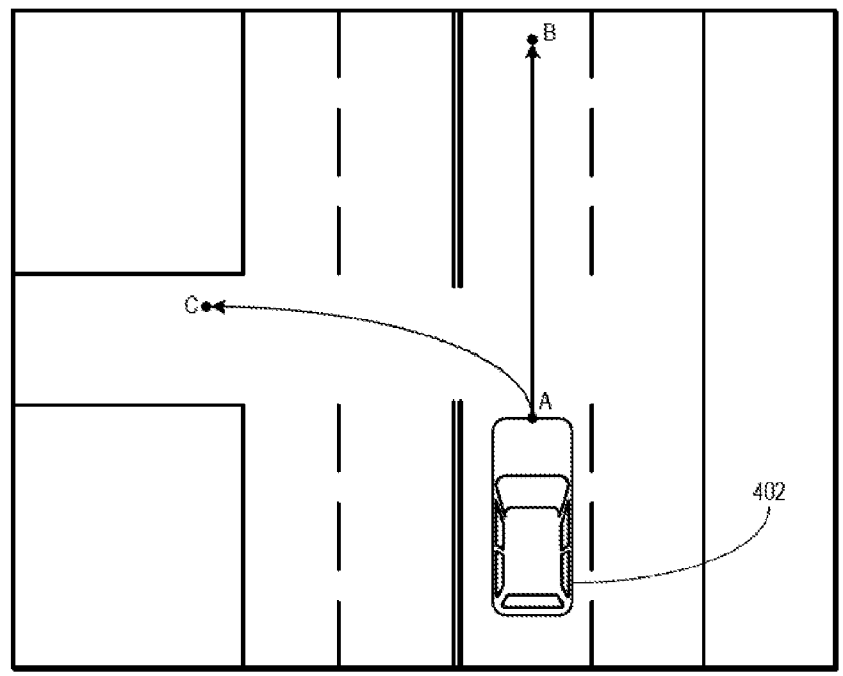
FIGS. 4A-4C illustrates various driving environments in which the autonomous vehicle may detect an object.
Figure 4B:
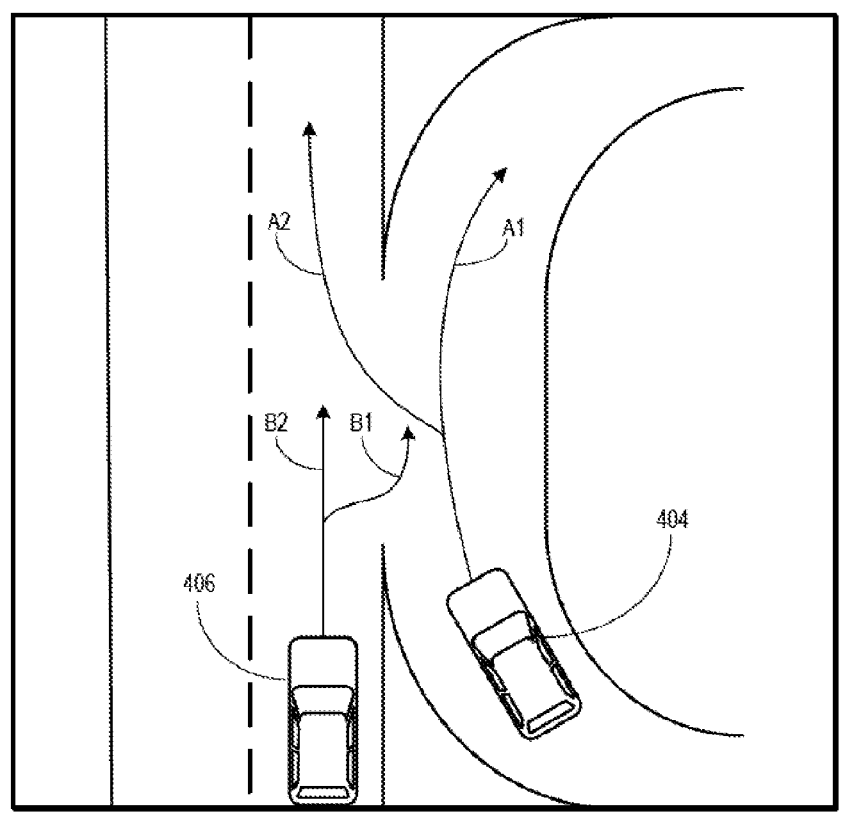
Figure 4C:
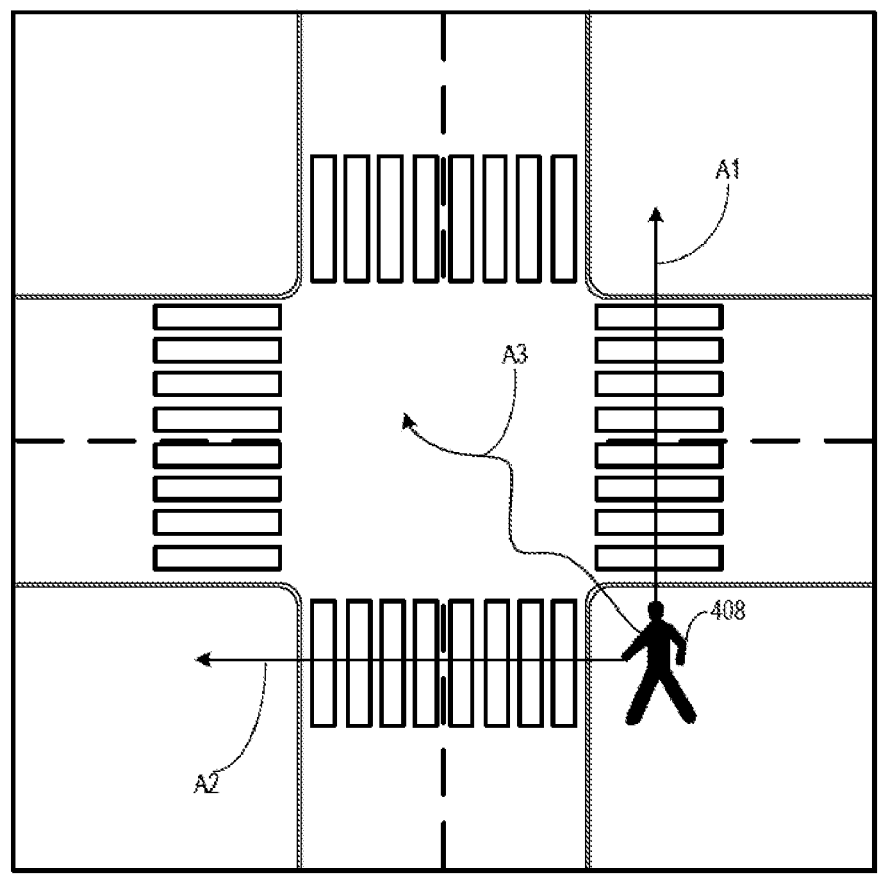

FIGS. 4A-4C illustrates various driving environments in which the autonomous vehicle 104 may monitor and collect behavior data of detected objects. In FIG. 4A, the autonomous vehicle 104 may detect and monitor a first vehicle 402 as it approaches an intersection of two roads. The autonomous vehicle 104 may first classify the vehicle based on a number of parameters. Thereafter, the autonomous vehicle 104 may then monitor the state of the detected vehicle, such as its speed, direction, orientation, starting position, the trajectory of detected vehicle, whether the detected vehicle is displaying any indicators (e.g., turn signals, headlights, brake lights, etc.), or a combination of these aspects (e.g., position and heading of the vehicle) or other such state information. The autonomous vehicle 104 may then record whether the detected vehicle turns (i.e., follows the path AC) or continues on its original path/trajectory (i.e., follows path AB). The autonomous vehicle 104 may monitor the intersection shown in FIG. 4A for a predetermined time (e.g., days, weeks, months, etc.) or for a predetermined number of events (e.g., a predetermined number of total objects, a predetermined number of objects that did turn, a predetermined number of objects that did not turn, etc.) The autonomous vehicle 104 may collect and record the behavior the autonomous vehicle 104 for each of the classification of vehicles that approach the intersection. Thus, the autonomous vehicle 104 may collect and record the number of times a passenger vehicle turned, the number of times a passenger vehicle did not turn, the number of times a commercial vehicle turned, etc., depending on the classification of objects detected at the intersection.

FIG. 4B illustrates a driving environment in which vehicles, such as a vehicle 404 and a vehicle 406, may be entering and exiting a highway, respectively. The autonomous vehicle 104 may monitor and record whether the vehicle 404 continues onto the highway (i.e., follows path A2) or whether the vehicle 404 continues along the roadway and does not enter the highway (i.e., follows path A1). In this regard, should the vehicle 404 enter the highway (i.e., follow the path A2), the autonomous vehicle 104 may record state data about the vehicle 404 as it enters the highway, such as the speed of the vehicle 404 entering the highway, the direction of the vehicle 404 as it enters the highway, the lane of the highway that the vehicle 404 entered, or other such state data.

Similarly, should the vehicle 404 not enter the highway (i.e., follow the path A1), the autonomous vehicle 104 may record state data about the vehicle 404 as it passes the highway, such as the speed of the vehicle 404 passing the highway, the direction of the vehicle 404 as it passed the highway, whether the vehicle 404 changed lanes or applied its brakes, or other such state data.

Moreover, the autonomous vehicle 104 may record the path the vehicle 404 followed and the classification of the vehicle 404. The autonomous vehicle 104 may also record other state information about the vehicle 404, such as the trajectory of vehicle 404, the orientation of the vehicle 404, the heading of the vehicle 404, whether the vehicle 404 is displaying any indicators (e.g., turn signals, headlights, brake lights, etc.), or a combination of these aspects (e.g., position and heading of the vehicle) or other such similar state information. In this manner, the autonomous vehicle 104 may record how various classes of vehicles behaved given this particular driving environment (e.g., approaching an opportunity to enter a highway).

Similarly, with regard to the vehicle 406, the autonomous vehicle 104 may monitor and record the behavior of the vehicle 406 as it approached a potential exit from the highway. For example, the autonomous vehicle 104 may monitor and record whether the vehicle 406 continued on the highway (i.e., followed the path B2) or whether the vehicle 406 proceeded onto the exit ramp (i.e., followed the path B1). In each of these instances, the autonomous vehicle 104 may also record state data about the vehicle 406. For example, should the vehicle 406 remain on the highway (i.e., follow the path B2), the autonomous vehicle 104 may record the lane of the highway in which the vehicle 406 is located, the speed of the vehicle 406, the direction of travel of the vehicle 406, and other such state information. Should the autonomous vehicle 104 monitor the vehicle 406 exit the highway (i.e., follow the path B1), the autonomous vehicle 104 may record such state information as the speed of the vehicle 406, the lane in which the vehicle 406 was in prior to exiting the highway, the direction of the vehicle 406, or other such state information. For vehicles approaching an opportunity to exit the highway, the autonomous vehicle 104 may record the path the vehicle 406 followed and the classification of the vehicle 406. In this manner, the autonomous vehicle 104 may record how various classes of vehicles behaved as they approached an opportunity to exit the highway.

As with the driving environment illustrated in FIG. 4A, the autonomous vehicle 104 may monitor the driving environment of FIG. 4B for any given duration of time or based upon any given event. For example, the autonomous vehicle 104 may be configured to monitor the driving environment of FIG. 4B for a number of days, weeks, months, or any other measurement of time. Similarly, the autonomous vehicle 104 may be configured to monitor the driving environment of FIG. 4B based on the number of vehicles passing the entrance ramp/exit ramp, the number of vehicles entering the highway, the number of vehicles exiting the highway, the number of vehicles that remain on the highway after passing the exit ramp, and other such events. Hence, regardless of whether the autonomous vehicle 104 is to record and monitor the vehicles based on a predetermined time or predetermined event, the autonomous vehicle 104 may record and monitor the paths (e.g., path A1, path A2, path B1, and path B2) various classes of vehicles follow when they approach an exit or entrance ramp for a highway.

The autonomous vehicle 104 may also record and monitor behavior data for non-vehicle objects as well. FIG. 4C illustrates a driving environment in which the autonomous vehicle 104 may monitor and record the behavior of a non-vehicle object 408, namely a pedestrian. The autonomous vehicle 104 may monitor which of the various paths (e.g., path A1, path A2, or path A3) the pedestrian 408 follows to cross the exemplary intersection. As with the driving environments shown in FIG. 4A and FIG. 4B, the autonomous vehicle 104 may record state data about the pedestrian 408, such as how fast the pedestrian 408 moves (e.g., walking, running, jogging, etc.), how much time it takes the pedestrian 408 to cross the intersection, how much time the pedestrian spends on any one of path A1, path A2, or path A3, the trajectory of the pedestrian, a combination of these aspects (e.g., position and heading of the pedestrian) or any other such state information. The autonomous vehicle 104 may also record and monitor other pedestrians, and may record which of the paths the pedestrians follow and how many times the pedestrians follow any one of the paths.

In this manner, the autonomous vehicle 104 may record which of the paths are preferable by pedestrians or which of the paths a pedestrian is expected to follow. As with the driving environments illustrated in FIG. 4A and FIG. 4B, the autonomous vehicle 104 may monitor the driving environment shown in FIG. 4C for any predetermined amount of time (e.g., minutes, days, weeks, etc.) or based on any observable metric (e.g., the number of monitored pedestrians, the number of times a particular path is followed, etc.).

FIGS. 4A-4C are illustrative of the driving environments that the autonomous vehicle 104 may monitor. The driving environments shown in FIGS. 4A-4C are not exhaustive. For example, the autonomous vehicle 104 may monitor other driving environments, such as an elementary school crossing, a highway interchange, a suburban intersection, a four-way stop sign intersection, or any other driving environment.

After monitoring the various driving environments, the autonomous vehicle 104 may communicate the collected state information to an object behavior model server 142. While the object behavior model server 142 is shown separately from the autonomous vehicle 104, it should be understood that the object behavior model server 142 may also be incorporated into the autonomous vehicle 104, such as by being incorporated into the autonomous driving computer system 144. Moreover, portions of the object behavior model server 142 may also reside in the memory 108 of the autonomous driving computer system 144. Combinations of the foregoing are also possible.

In addition, the object behavior model server 142 may also develop object models based on data collected by other means, such as non-autonomous vehicles, satellite imagery, traffic reports, police reports, user-provided information, or other such means.

The autonomous vehicle 104 may communicate with the object behavior model server via a network 140. The network 140 may be implemented as a single network or as any combination of networks. The networks 140 may also include various types of networks. As examples, the network 140 may include a Wide Area Network ("WAN"), such as the Internet; a Local Area Network ("LAN"); a Personal Area Network ("PAN"), or a combination of WANs, LANs, and PANs. Moreover, the network 140 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of protocol. Alternatively, the autonomous vehicle 104 may communicate directly with the object behavior model server 142, such as through a Universal Serial Bus ("USB") interface or the like. Combinations of direct and indirect communications between the autonomous vehicle 104 and the object behavior model server 142 are also possible.

The object behavior model server 142 is operative to develop object models for the various classifications of objects based on the object data 112 collected by the autonomous vehicle 104. As used in this disclosure, an "object model" may refer to the expected behavior of a given class of object in a particular driving environment. An object model may define how an object may behave given the driving environment. For example, the object behavior model server 142 may define an object model for passenger vehicles entering a four-way intersection. In this example, the object model may define the probability that a passenger vehicle proceeds straight through the intersection, the probability that a passenger vehicle turns left at the intersection, and the probability that the passenger vehicle turns right at the intersection.

The object model may further define the behavior of the passenger vehicle, such as the approximate amount of time the passenger vehicle is expected to stop at the intersection, the approximate amount of time the passenger vehicle is expected to move through the intersection, the approximate speed of the passenger as it turns or proceeds through the intersection, or other such behavior information. In this manner, an object model may provide the autonomous vehicle 104 with behavior information such that the autonomous vehicle 104 may predict the behavior of the corresponding classification of vehicle in a given driving environment. Based on the behavior information provided by the object model, the autonomous vehicle 104 may respond with an action or take an action depending on the predicted behavior defined by the object model.

In addition to how an object itself may behave, an object model may provide information as to how the autonomous vehicle 104 may react or behave. For example, the object model may provide information that influences whether the autonomous vehicle 104 accelerates, decelerates, turns right, turns left, enables an indicator (e.g., turning on a headlight or turning light), disables an indicator (e.g., turning off a headlight or turning light), or engages some other vehicle behavior (e.g., turning on/off windshield wipers, turning on/off fog lights, turning on/off high beams, etc.) Thus, an object model may not only incorporate information about what the behavior of the associated object may be, but the object model may also provide information that may influence how the autonomous vehicle 104 vehicle may react.

In addition, object models for differing classifications of objects may provide information that leads to differing actions by the autonomous vehicle 104 depending on the type of object associated with the object model. For example, an object model associated with a passenger vehicle classification may provide information that influences the autonomous vehicle 104 to take actions that are different for an object model associated with a motorcycle classification. Moreover, the actions may differ even when the predicted action of the object is the same. For example, a motorcycle object model and a passenger vehicle object model may define that the associated objects (i.e., the motorcycle and the passenger vehicle) may turn left under a given circumstance, but that the behavior of the autonomous vehicle 104 may be different for each circumstance. Thus, an object model may be further defined by the type of object classification (e.g., motorcycle, passenger vehicle, commercial truck, etc.) assigned to the object model.

In addition, an object model may generalize, or be specific to, a given driving environment. For example, an object model may define the behavior of a given object classification for a four-way intersection. However, the object model may be more specific in that the object model may correspond to a particular geographic location having a four-way intersection (e.g., the intersection of 5th Avenue and 42nd Street in New York City, N.Y.). Thus, depending on the granularity and specificity of the object model, the object model may provide behavior information regarding an object classification for a given type of driving environment, or may even provide behavior information regarding an object classification for a specific geographic location of a given type of driving environment.

Moreover, an object model may be tailored or based on specific types of driving conditions. For example, an object model may provide behavior information based on weather conditions (e.g., rain, snow, sleet, hail, fog, etc.) An object model based on a first weather condition (e.g., rain) may provide information that differs from an object model based on a second weather condition (e.g., snow). The differing information may be associated with the corresponding object classification of the object model, the behavior of the autonomous vehicle 104, or a combination thereof. Other examples of driving conditions on which an object model may be based include the time of day, traffic conditions, whether there a blind corner is involved in a road/intersection, whether a hill is involved in a roadway, or other such driving conditions.

The object behavior model server 142 is operative to develop object models that do not yet exist for corresponding object classifications and to refine already existing object models. With regard to developing new object models, the object behavior model server 142 may initially receive object data 116 (e.g., behavior and/or state data) from the autonomous vehicle 104. The object behavior model server 142 may then determine whether an object model already exists for the object classification corresponding to the received object data 116. Should the object behavior model server 142 not have an existing object model, the object behavior model server 142 may then develop a new object model for the corresponding object classification. However, should an object model already exist for the corresponding object classification, the object behavior model server 142 may then refine the object model by supplementing the behavior information in the already-existing object model with the newly-received behavior/state data from the autonomous vehicle 104. In this manner, the object models residing on the object behavior model server 142 may be continuously refined to improve the accuracy of the developed object models and the behavior prediction of the autonomous vehicle 104.

Figure 5:
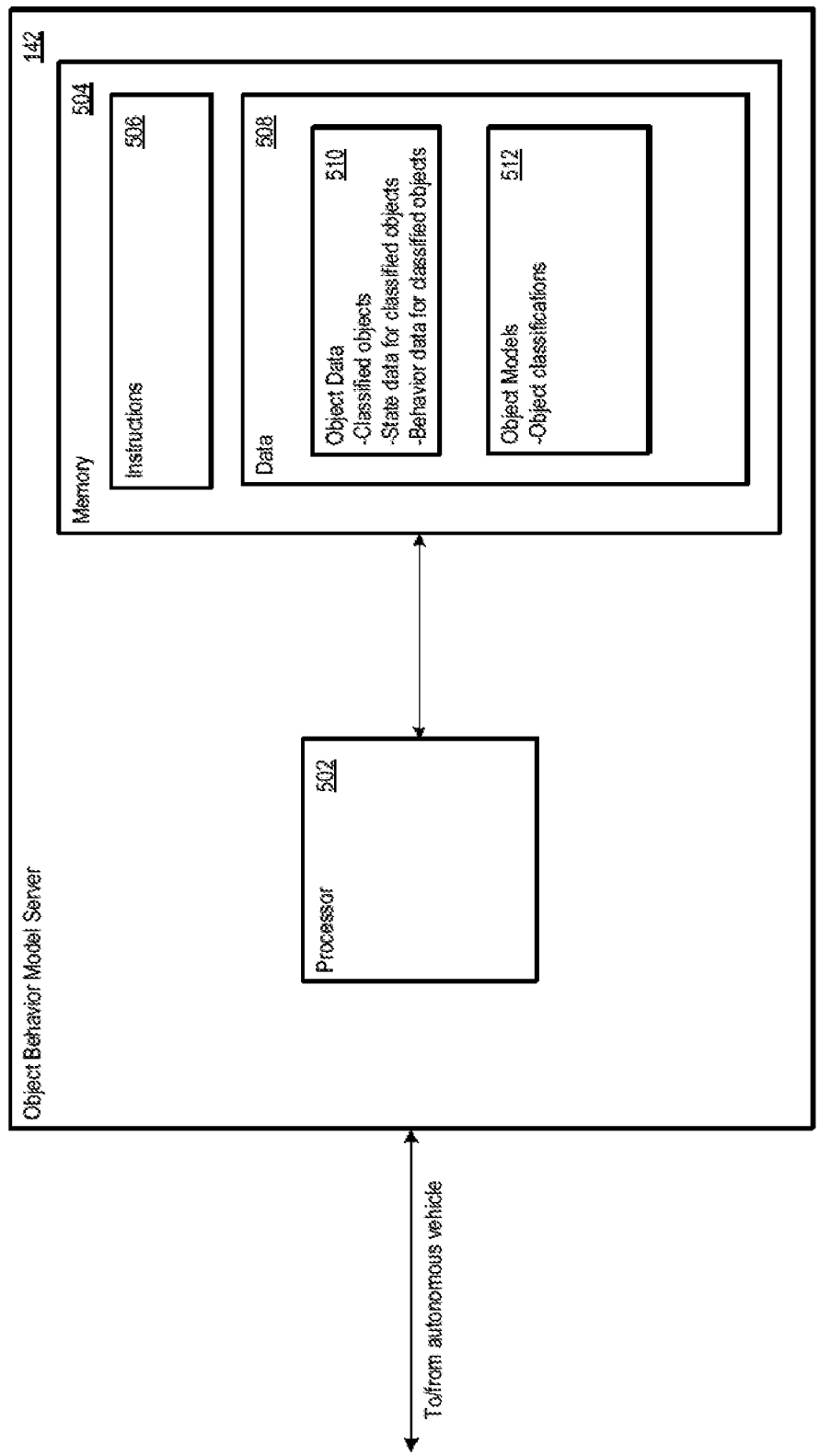
FIG. 5 illustrates an example of an object behavior model server for determining object models according to aspects of the disclosure.

FIG. 5 illustrates one example of the object behavior model server 142. In one embodiment, the object behavior model server 142 may include a processor 502 and a memory 504. The object behavior model server 142 may also include other components typically present in a general purpose computer.

The memory 504 may store information accessible by the processor 502, such as instructions 506 and data 508 that may be executed or otherwise used by the processor 502. The memory 504 may be of any type of memory operative to store information accessible by the processor 502, including a computer-readable medium, or other medium that stores data that may be read with the aid of an electronic device. Examples of the memory 108 include, but are not limited to, a hard-drive, a memory card, ROM, RAM, DVD, or other optical disks, as well as other write-capable and read-only memories. Systems and methods may include different combinations of the foregoing, whereby different portions of the instructions and data are stored on different types of media.

The instructions 506 may be any set of instructions that may be executed directly (such as machine code) or indirectly (such as scripts) by the processor 502. For example, the instructions 506 may be stored as computer code on the computer-readable medium. In that regard, the terms "instructions" and "programs" may be used interchangeably herein. The instructions 506 may be stored in object code format for direct processing by the processor 502, or in any other computer language including scripts or collections of independent source code modules that are interpreted on demand or compiled in advance. Functions, methods and routines of the instructions 506 are explained in more detail below.

The data 508 may be retrieved, stored, or modified by the processor 502 in accordance with the instructions 506. For instance, although the disclosed embodiments not limited by any particular data structure, the data 508 may be stored in computer registers, in a relational database as a table having a plurality of different fields and records, XML documents, flat files, or in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 508 may comprise any information sufficient to identify the relevant information, such as numbers, descriptive text, proprietary codes, references to data stored in other areas of the same memory or different memories (including other network locations) or information that is used by a function to calculate the relevant data.

The processor 502 may be any conventional processor, such as processors from the Intel Corporation or AMD. Alternatively, the processor 502 may be a dedicated device such as an ASIC. Although FIG. 5 functionally illustrates the processor 502, the memory 504, and other elements of the object behavior model server 142 as being within the same block, it will be understood by those of ordinary skill in the art that the processor 502 and the memory 504 may actually comprise multiple processors and memories that may or may not be stored within the same physical housing. For example, the memory 504 may be a hard drive or other storage media located in a housing different from that of the object behavior model server 142.

As discussed previously, the object behavior model server 142 may be operative to develop new object models or refine already existing object models based on the information collected by the autonomous vehicle 104. In one embodiment, data 508 stored in the memory 504 includes received object data 510 and one or more object models 512. The received object data 510 may include the object data 116 collected by the autonomous vehicle 104. In addition, the object data 510 may include object data collected by other means, such as satellite imagery, traffic reports, police reports, and other such means.

The object behavior model server 142 may develop one or more of the object models 512 based on the object data 510. As discussed previously, each classification of object (e.g., passenger vehicle, light truck, pedestrian, bicycle, etc.) may be associated with one or more object models. In one embodiment, an object classification may be associated with a number of object models, where each object model corresponds to a driving environment. For example, with reference to FIG. 4A and FIG. 4B, a "passenger vehicle" object classification may be associated with an object model for a four-way intersection and an object model for entering/exiting a highway. Moreover, and as also discussed, an object model may further correspond to a specific geographic location of a particular type of driving environment.

In one embodiment of the object behavior model server 142, the object behavior model 142 may develop object models based on the expected probability that an object will perform a given action. For example, with reference to FIG. 4A, the object behavior model server 142 may receive object data about one or more vehicles 402, such as the number times a given classification of vehicle turned (e.g., followed path AC) or the number of times a given classification of vehicle continued straight (e.g., followed path AB). In this embodiment, the object behavior model server 142 may determine the expected probability that a given classification of vehicle will turn by determining number of times the path AC and dividing this number by the total number of paths taken. Similarly, the object behavior model server 142 may determine the expected probability that a given classification of vehicle will continue straight by determining the number of times path AB was taken and dividing this number by the total number of paths taken.

As is understood in the art, determining expected probabilities that a particular path will be followed is one statistical technique that may be used to predict the behavior of a given object or to provide information for influencing the behavior of the autonomous vehicle 104. In addition, a variety of statistical estimation techniques may be used, alone or in combination, including any existing statistical estimation, machine learning, classification or other optimization methods. Further examples include regression analysis, neural networks, decision trees, boosting, support vector machines, k-nearest neighbors, combinations of the foregoing, and other such examples.

The expected probability that path AC will be taken or that the expected probability that path AB will be taken may be further refined based on supplemental behavior data. For example, after initially establishing the object model for the vehicle 402 shown in FIG. 4A, the object behavior model server 142 may receive additional behavior data based on further monitoring by the autonomous vehicle 104 or other means previously described. The object behavior model server 142 may then re-determine the expected probabilities of the various paths using this supplemental behavior data.

The object behavior model server 142 may determine similar object models for the driving environments shown in FIG. 4B and FIG. 4C. With specific reference to FIG. 4C, the object behavior model server 142 may develop a non-vehicle object model for a pedestrian classification based on the monitored pedestrian movements, such as the probability that the pedestrian 408 follows any one of path A1, path A2, or path A3. In addition, this non-vehicle object model may be further refined based on later-monitored and recorded behavior data by the autonomous vehicle 104.

While the foregoing discussion of the object models has focused on path prediction and path probabilities, the object behavior model server 142 may develop object models that encompass various behavioral aspects of a given classification of objects. For example, an object model may provide for probable speeds, probable roadway lanes, probable direction of travel, or other such behavioral aspects. In addition, an object model for a first classification of objects may encompass different behavioral aspects than an object model for a second classification of objects. For example, an object model for a passenger vehicle classification may encompass behavioral aspects different from an object model for a pedestrian classification. Moreover, the object models may vary according to driving environments. Thus, an object model for a passenger vehicle classification in a four-way intersection driving environment may be different than an object model for the passenger vehicle classification in an entering/exiting highway driving environment. Thus, the object behavior model server 142 may develop the object models for a variety of situations and conditions, including object classification and driving environment.

Figure 6:
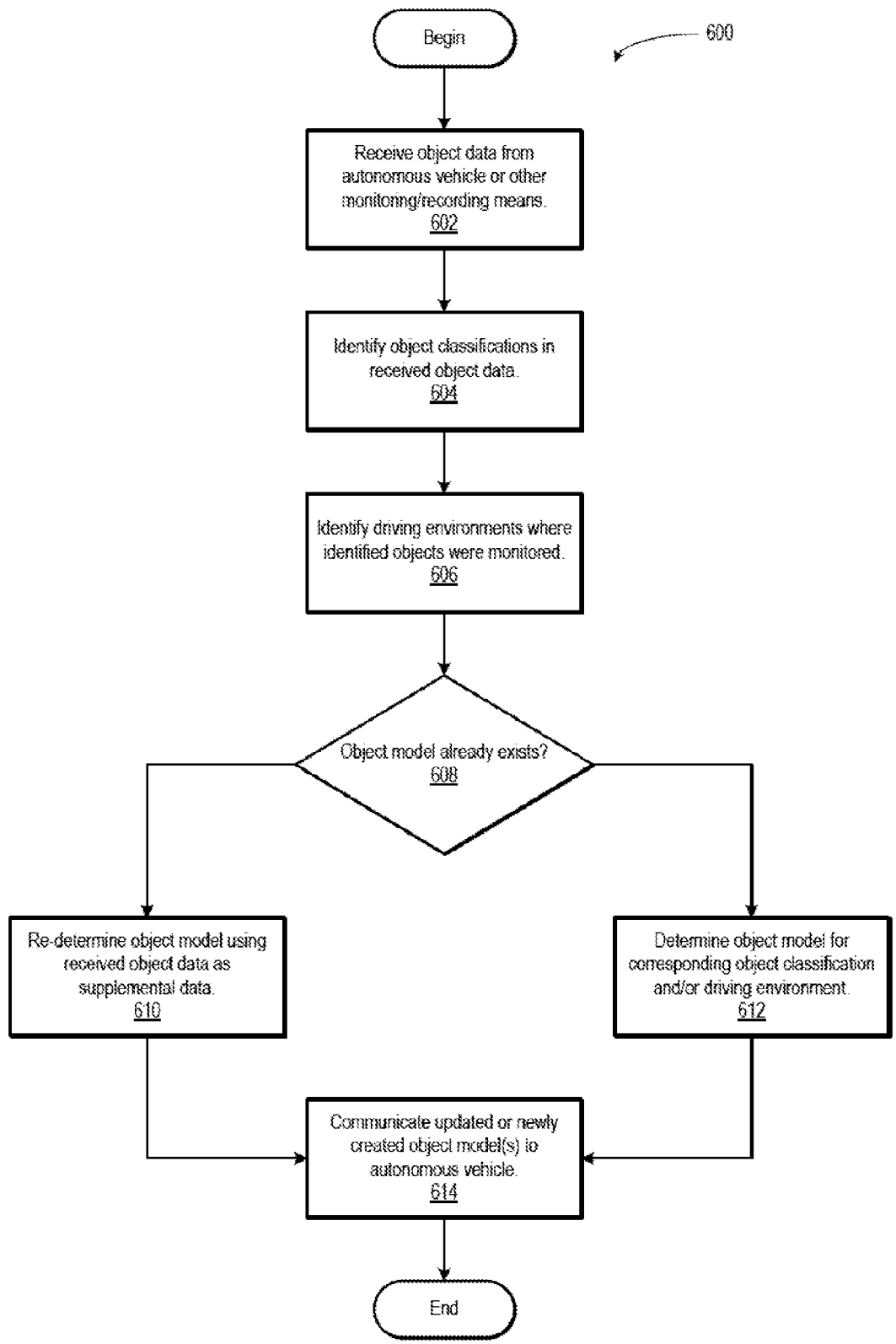
FIG. 6 illustrates an example of logic flow for determining object models according to aspects of the disclosure.

FIG. 6 illustrates one example of logic flow 600 for developing object models for the various object classifications. Initially, the object behavior model server 142 may receive object data, including behavior/state data, from the autonomous vehicle 104 (Block 602). Thereafter, the object behavior model server 142 may analyze the received object data to determine the object classifications identified by the object data (Block 604). The object behavior model server 142 may then identify the driving environments of the identified object classifications from the received object data (Block 606).

Using the identified object classifications and identified driving environments, the object behavior model server 142 may determine whether corresponding object models already exist (Block 608). Should corresponding object models already exist, the object behavior model server 142 may refine the already existing object models using the received object data as supplemental data. Refining an already existing object model may include re-determining the object model for a given classification and/or driving environment using the already existing object model and the received object data as supplemental data. In other words, the already existing object model may be updated with the received object data. However, should an object model not exist for the corresponding object classification and/or driving environment, the object behavior model server 142 may then develop a corresponding object model using the received object data (Block 612). The object behavior model server 142 may then communicate the updated or newly created object model to the autonomous vehicle 104 for use in predicting the behavior of detected objects (Block 614).

In this manner, the monitoring and recording of detected object behavior by the autonomous vehicle 104 may facilitate the development of robust object models for predicting the behavior of the monitored and recorded objects. Moreover, the object models may be tailored to specific driving environments along various parameters. Because the object models may be customized with parameters specific to a given driving environment, the autonomous vehicle 104 may better accurately predict the behavior of a detected object and take actions (e.g., braking, accelerating, etc.) in response to the behavior of the detected object. In addition, since the autonomous vehicle 104 may continuously collect behavior information about detected objects, already existing object models may be further refined to better reflect the behavior of real-world objects. Thus, the partnership between the object model behavior server 142 and the autonomous vehicle 104 forms a symbiotic relationship in which the monitoring by the autonomous vehicle 104 enhances the object models determined by the object behavior model server 142, and the updated object models determined by the object behavior model server 142 improve the performance and reaction time of the autonomous vehicle 142.

Although aspects of this disclosure have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of this disclosure as defined by the appended claims. Furthermore, while certain operations and functions are shown in a specific order, they may be performed in a different order unless it is expressly stated otherwise.

The invention claimed is:

1. A system for determining behavior data used by an autonomous vehicle, the system comprising:
a memory configured to store an object model; and
one or more processors in communication with the memory, the one or more processors configured to:
identify a type of driving environment and a geographic location of the driving environment;
receive, from a monitoring source, object data associated with a detected object;
analyze the object data to determine an object classification for the detected object, the object classification identifying a class of objects;
determine whether an object model currently exists for the object classification, wherein the object model correlates the expected behavior of objects within the determined object classification with the identified type of driving environment and the identified geographic location;
determine a new object model for the object classification based on the received object data when an object model does not currently exist for the object classification;
update the currently-existing object model for the object classification based on the received object data when an object model currently exists for the object classification; and
control the autonomous vehicle based on the object model.

2. The system of claim 1, wherein the one or more processors are further configured to identify the type of driving environment from data received from the monitoring source.

3. The system of claim 1, wherein the monitoring source is an autonomous vehicle.

4. The system of claim 1, wherein the detected object is a non-vehicle object.

5. The system of claim 1, wherein the object model comprises a plurality of probabilities, wherein at least one probability is based on a path of travel that the detected object was observed traveling.

6. The system of claim 5, wherein at least one probability of the plurality of probabilities identifies a probability that a detected object will travel a path of travel associated with the path of travel previously traveled by a previously detected object.

7. The system of claim 1, wherein the behavior data comprises a plurality of probabilities, wherein at least one probability is based on a speed at the detected object was observed moving.

8. The system of claim 7, wherein at least one probability of the plurality of probabilities identifies a probability that a detected object will travel at a speed associated with the speed at which a previously detected object was determined to be moving.

9. The system of claim 1, wherein the one or more processors are further configured to determine an object model for a plurality of types of driving environments.

10. The system of claim 1, wherein the one or more processors are further configured to communicate the object model to the autonomous vehicle.

11. The system of claim 1, wherein:
the monitoring source comprises the autonomous vehicle; and
the one or more processors are further configured to communicate a plurality of object models to the autonomous vehicle, wherein the one or more processors are remotely located from the autonomous vehicle.

12. A method for determining behavior data used by an autonomous vehicle, the method comprising:
identifying a type of driving environment and a geographic location of the driving environment;
receiving, with one or more processors, from a monitoring source, object data associated with a detected object;
analyzing, with the one or more processors, the object data to determine an object classification for the detected object, the object classification identifying a class of objects;
determining whether an object model currently exists for the expected behavior of objects within the determined object classification in the identified type of driving environment and at the identified geographic location;

determining a new object model for the object classification based on the received object data when an object model does not currently exist for the object classification;

updating the currently-existing object model for the object classification based on the received object data when an object model currently exists for the object classification; and controlling the autonomous vehicle based on the object model.

13. The method of claim 12, further comprising identifying the driving environment from data received from the monitoring source.

14. The method of claim 12, wherein the monitoring source is an autonomous vehicle.

15. The method of claim 12, wherein the detected object is a non-vehicle object.

16. The method of claim 12, wherein the object model comprises a plurality of probabilities, wherein at least one probability is based on a path of travel that the detected object was observed traveling.

17. The method of claim 16, wherein at least one probability of the plurality of probabilities identifies a probability that a detected object will travel a path of travel associated with the path of travel previously traveled by a previously detected object.

18. The method of claim 12, wherein the behavior data comprises a plurality of probabilities, wherein at least one probability is based on a speed at which the detected object was observed moving.

19. The method of claim 18, wherein at least one probability of the plurality of probabilities identifies a probability that a detected object will travel at a speed associated with the speed at which a previously detected object was determined to be moving.

20. The method of claim 12, further comprising determining an object model for a plurality of types of driving environments.

21. The method of claim 12, further comprising communicating the object model to the autonomous vehicle.

22. The system of claim 12, wherein:

the monitoring source comprises the autonomous vehicle; and the method further comprises communicating a plurality of object models to the autonomous vehicle, wherein at least one of the plurality of object models was determined remotely from the autonomous vehicle and at least one other object model was updated remotely from the autonomous vehicle.

23. A system for determining behavior data used by an autonomous vehicle, the apparatus system comprising:

a memory configured to store an object model; and one or more processors in communication with the memory, the one or more processors configured to:

identify a type of driving environment and a geographic location of the driving environment;

receive object data associated with a plurality of detected objects from a source that monitored the behavior of the plurality of detected objects in the identified type of driving environment and the identified geographic location;

identify at least one object classification for each of the detected objects based on the received object data, each object classification identifying a class of objects determine, for each identified object classification, whether an object model currently exists for the expected behavior of objects within the identified object classification in the identified type of driving environment and at the identified geographic location;

determine a new object model for an identified object classification based on the received object data when an object model does not currently exist for the object classification; and update the currently-existing object model for an identified object classification based on the received object data when an object model currently exists for the object classification; and control the autonomous vehicle based on the object model.

* * * * *